(12) United States Patent
Kryda et al.

(10) Patent No.: US 7,756,355 B2
(45) Date of Patent: Jul. 13, 2010

(54) METHOD AND APPARATUS PROVIDING ADAPTIVE NOISE SUPPRESSION

(75) Inventors: Ken Kryda, Pasadena, CA (US); Michael Hartmann, Pasadena, CA (US)

(73) Assignee: Aptina Imaging Corp., Grand Cayman (KY)

( * ) Notice: Subject to any disclaimer, the term of this patent is extended or adjusted under 35 U.S.C. 154(b) by 1104 days.

(21) Appl. No.: 11/418,200

(22) Filed: May 5, 2006

(65) Prior Publication Data

US 2007/0258657 A1    Nov. 8, 2007

(51) Int. Cl.
*G06K 9/40*    (2006.01)
(52) U.S. Cl. ........................ 382/275; 348/241; 702/191
(58) Field of Classification Search ................ 382/100, 382/172, 254, 274, 275; 345/428, 590; 348/193, 348/241, 251, 533, 606, 607, 622, 683, 701; 358/461, 3.03, 3.05; 702/69, 191, 195; 375/227, 375/254, 278, 284, 346
See application file for complete search history.

(56) References Cited

U.S. PATENT DOCUMENTS

| | | | |
|---|---|---|---|
| 6,195,467 B1 * | 2/2001 | Asimopoulos et al. | 382/261 |
| 6,747,697 B1 * | 6/2004 | Lin et al. | 348/246 |
| 7,054,503 B2 * | 5/2006 | Ishikawa | 382/275 |
| 7,432,985 B2 * | 10/2008 | Ishikawa et al. | 348/616 |
| 2003/0228067 A1 * | 12/2003 | Miyake et al. | 382/275 |
| 2004/0196408 A1 * | 10/2004 | Ishikawa et al. | 348/616 |
| 2005/0069217 A1 * | 3/2005 | Mukherjee | 382/266 |
| 2005/0100237 A1 * | 5/2005 | Kong et al. | 382/261 |
| 2005/0135703 A1 * | 6/2005 | Wang | 382/275 |
| 2007/0009176 A1 * | 1/2007 | Lim et al. | 382/275 |

FOREIGN PATENT DOCUMENTS

| | | |
|---|---|---|
| EP | 1 389 771 A2 | 2/2004 |
| WO | WO 02/05213 A2 | 1/2002 |

* cited by examiner

*Primary Examiner*—Anand Bhatnagar
(74) *Attorney, Agent, or Firm*—Dickstein Shapiro LLP (57) ABSTRACT

A method of reducing noise in an image including steps for obtaining a first value for a target pixel, obtaining a respective second value for each neighboring pixel surrounding the target pixel, identifying a spread for the second values, comparing the spread to a threshold value, and, if the spread if below the threshold value, calculating a new value using the second values, and replacing the first value with the new value.

44 Claims, 7 Drawing Sheets

FIG. 1
PRIOR ART

| | | | | | |
|---|---|---|---|---|---|
| 10 | 11 | 12 | 13 | 14 | 15 |
| 20 | 21 | 22 | 23 | 24 | 25 |
| 30 | 31 | 32a | 33 | 34 | 35 |
| 40 | 41 | 42 | 43 | 44 | 45 |
| 50 | 51 | 52 | 53 | 54 | 55 |
| 60 | 61 | 62 | 63 | 64 | 65 |

FIG. 2A

| 110 | | | | | |
|---|---|---|---|---|---|
| 10 | 11 | 12 | 13 | 14 | 15 |
| 20 | 21 | 22 | 23 | 24 | 25 |
| 30 | 31 | 32b | 33 | 34 | 35 |
| 40 | 41 | 42 | 43 | 44 | 45 |
| 50 | 51 | 52 | 53 | 54 | 55 |
| 60 | 61 | 62 | 63 | 64 | 65 |

FIG. 6

METHOD AND APPARATUS PROVIDING ADAPTIVE NOISE SUPPRESSION

FIELD OF THE INVENTION

The invention relates generally to the field of solid state imager devices, and more particularly to a method and apparatus for noise reduction in a solid state imager device.

BACKGROUND OF THE INVENTION

Solid state imagers, including charge coupled devices (CCD), CMOS imagers and others, have been used in photo imaging applications. A solid state imager circuit includes a focal plane array of pixel cells, each one of the cells including a photosensor, which may be a photogate, photoconductor or a photodiode having a doped region for accumulating photo-generated charge.

One of the most challenging problems for solid state image sensors is noise reduction, especially for sensors with a small pixel size. The effect of noise on image quality increases as pixel sizes continue to decrease and may have a severe impact on image quality. Specifically, noise impacts image quality in smaller pixels because of reduced dynamic range. One of the ways of solving this problem is by improving fabrication processes; the costs associated with such improvements, however, are high. Accordingly, engineers often focus on other methods of noise reduction. One such solution applies noise filters during image processing. There are many complicated noise reduction algorithms which reduce noise in the picture without edge blurring, however, they require huge calculating resources and cannot be implemented in a silicon-on-a-chip application. Most simple noise reduction algorithms blur the edges of the images.

Two exemplary methods that may be used for image denoising are briefly discussed herein. The first method includes the use of local smoothing filters, which work by applying a local low-pass filter to reduce the noise component in the image. Typical examples of such filters include averaging, medium and Gaussian filters. One problem associated with local smoothing filters is that they do not distinguish between high frequency components that are part of the image and those created due to noise. As a result, these filters not only remove noise but also blur the edges of the image.

A second group of denoising methods work in the spatial frequency domain. These methods typically first convert the image data into a frequency space (forward transform), then filter the transformed image and finally convert the image back into the image space (reverse transform). Typical examples of such filters include DFT filters and wavelength transform filters. The utilization of these filters for image denoising, however, is impeded by the large volume of calculations required to process the image data. Additionally, block artifacts and oscillations may result from the use of these filters to reduce noise. Further, these filters are best implemented in a YUV color space (Y is the luminance component and U and V are the chrominance components). Accordingly, there is a need and desire for an efficient image denoising method and apparatus which do not blur the edges of the image.

BRIEF SUMMARY OF THE INVENTION

The invention, in various exemplary embodiments, relates to a method and apparatus that allows for image denoising in an imaging device.

In accordance with exemplary embodiments of the invention, a method and implementing apparatus for reducing noise in image processing includes steps for obtaining a first value for a target pixel, obtaining a respective second value for each neighboring pixel surrounding the target pixel, identifying a spread for the second values, comparing the spread to a threshold value, and, if the spread if below the threshold value, calculating a new (e.g., average) value using the second values, and replacing the first value with the new value.

The exemplary noise filter could be applied either to each color separately in Bayer, Red/Green/Blue (RGB), Cyan/Magenta/Yellow/Key (CMYK), luminance/chrominance (YUV), or other color space. The invention suppresses (or removes) noise introduced by the pixel with digital algorithms without blurring the image. As noise scales with gain, it is possible to scale the correction such that more noise may be suppressed at higher gain levels. Noise suppression will improve both the visual appearance of the image (i.e., smoother surfaces and sharper edges), and later processing such as compression, allowing higher compression ratios.

BRIEF DESCRIPTION OF THE DRAWINGS

The foregoing and other advantages and features of the invention will be more readily understood from the following detailed description of the invention provided below with reference to the accompanying drawings, in which.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of the embodiments of the invention; however, the sequence of steps is not limited to that set forth herein and may be changed as is known in the art, with the exception of steps necessarily occurring in a certain order.

The term "pixel," as used herein, refers to a photo-element unit cell containing a photosensor device and associated structures for converting photons to an electrical signal. For purposes of illustration, a small representative three-color pixel array is illustrated in the figures and description herein. However, the invention may be applied to monochromatic imagers as well as to imagers for sensing fewer than three or more than three color components in an array. Accordingly, the following detailed description is not to be taken in a limiting sense, and the scope of the present invention is defined only by the appended claims.

Figure 1:
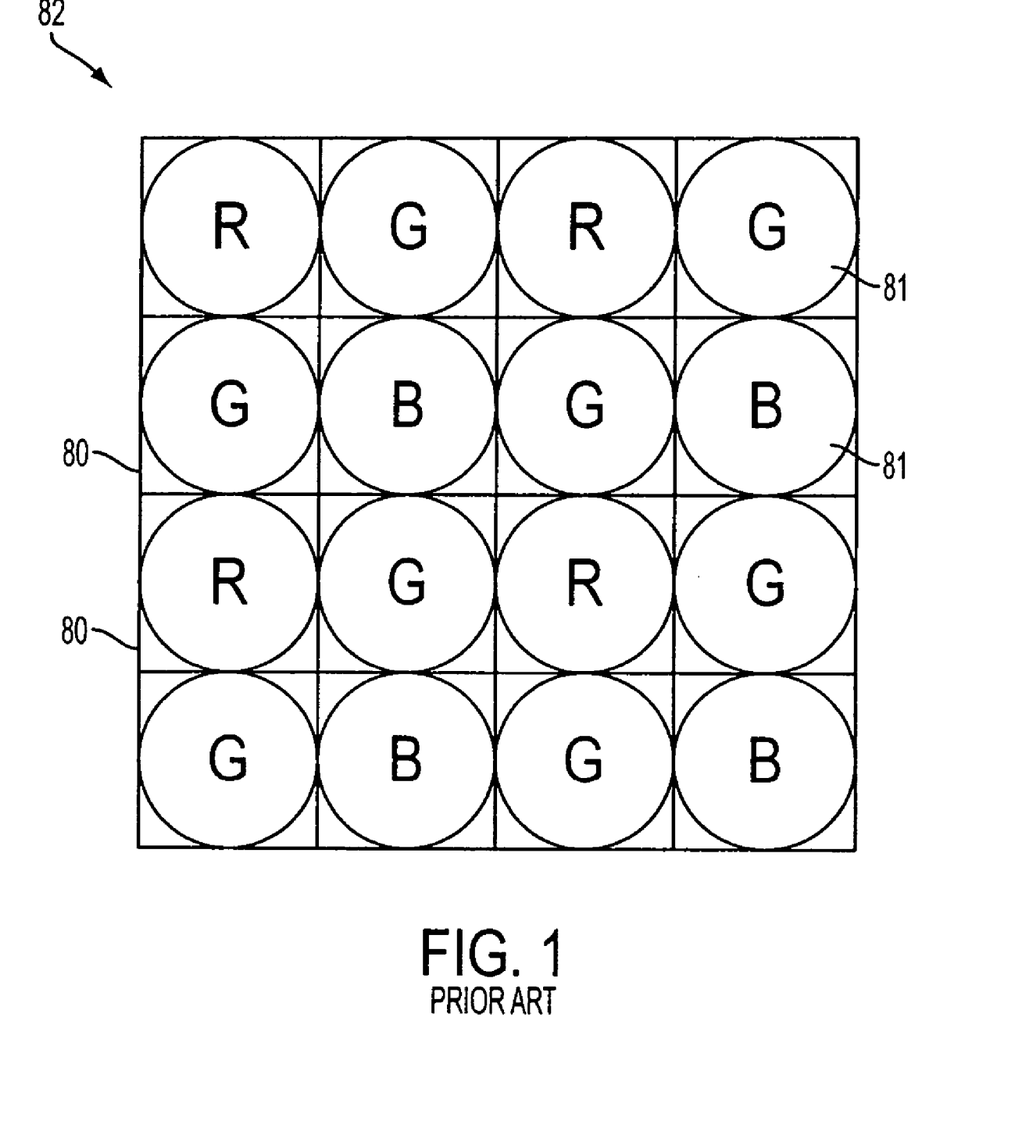
FIG. 1 is a top-down view of a conventional microlens and color filter array used in connection with a pixel array.

FIG. 1 depicts one exemplary conventional color filter array 82, arranged in a Bayer pattern, covering a pixel array to focus incoming light. It should be understood that, taken alone, a pixel generally does not distinguish one incoming color of light from another and its output signal represents only the intensity of light received, not any identification of color. However, pixels 80, as discussed herein, are referred to by color (i.e., "red pixel," "blue pixel," etc.) when a color filter 81 is used in connection with the pixel array to focus a particular wavelength range of light, corresponding to a particular color, onto the pixels 80. Accordingly, when the term "red pixel" is used herein, it is referring to a pixel associated with and receiving light through a red color filter; when the term "blue pixel" is used herein, it is referring to a pixel associated with and receiving light through a blue color filter; and when the term "green pixel" is used herein, it is referring to a pixel associated with and receiving light through a green color filter.

Figure 2A:
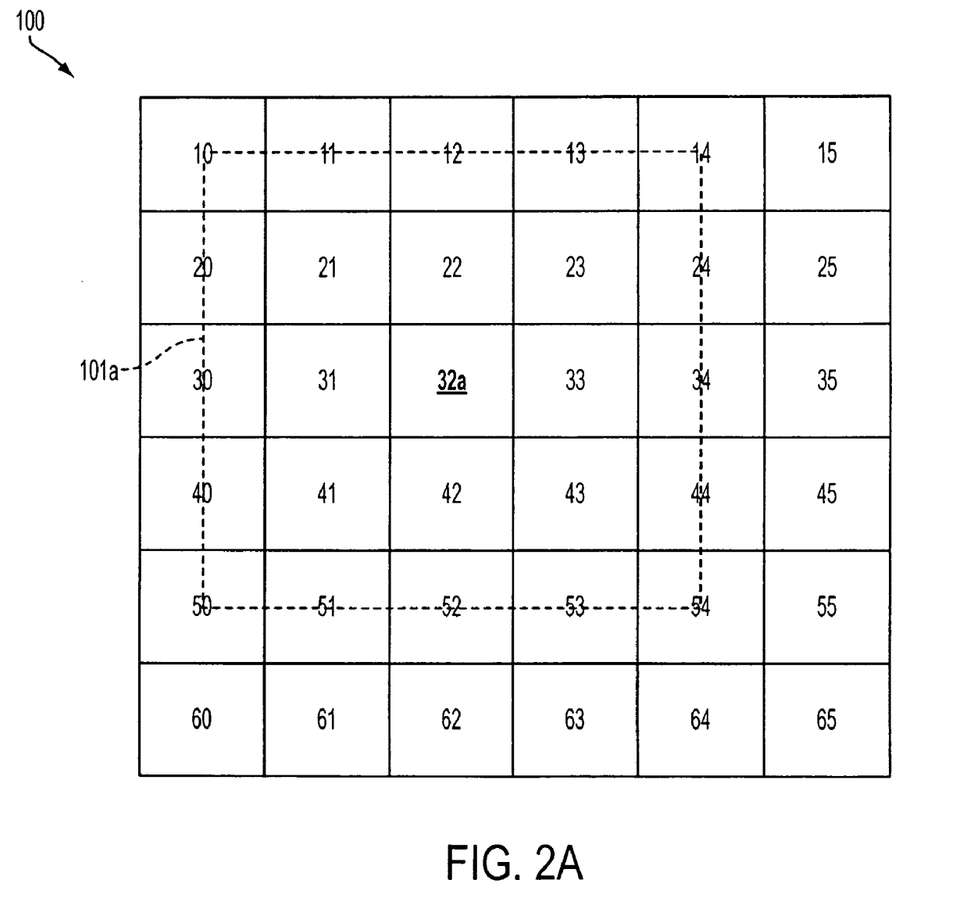
FIG. 2A depicts an image correction kernel for a red or blue pixel of a pixel array in accordance with the invention.
Figure 2B:
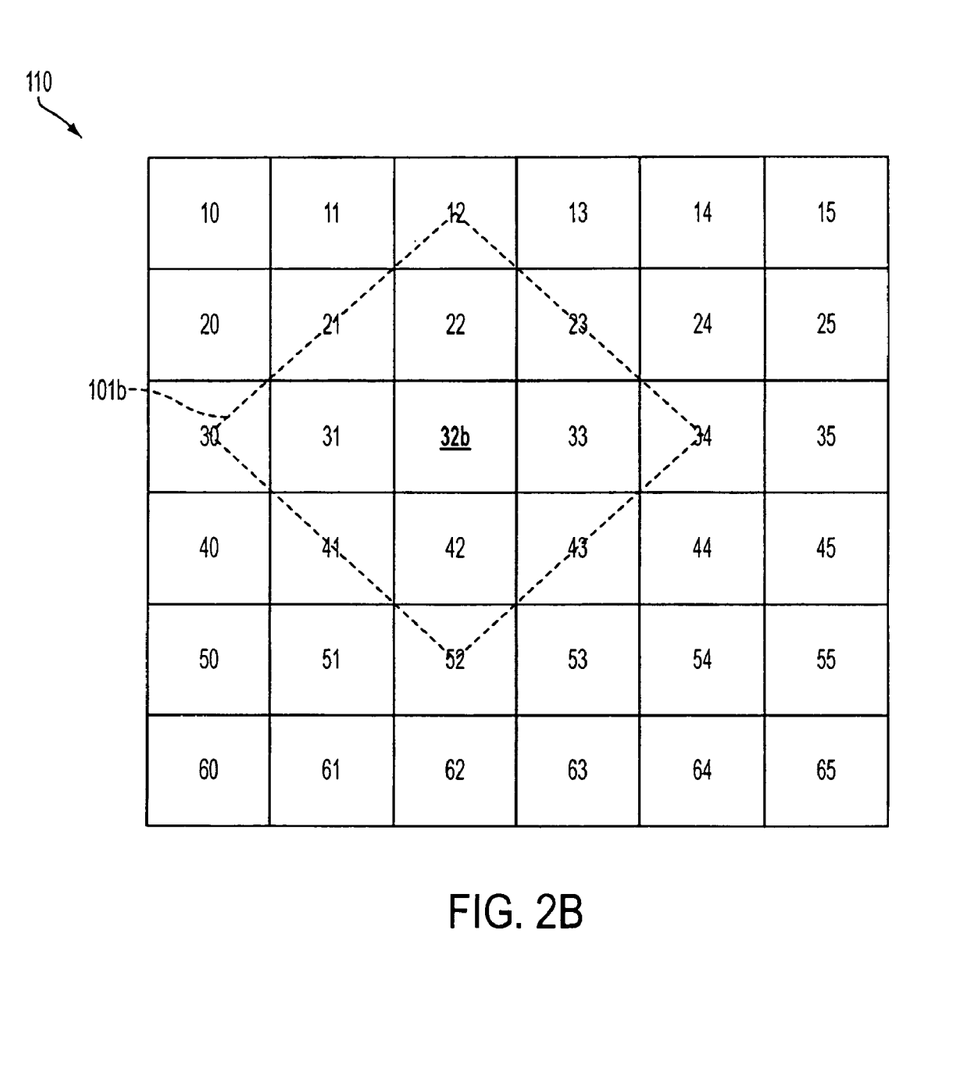
FIG. 2B depicts a correction kernel for a green pixel of a pixel array in accordance with the invention.

Figures, FIGS. 2A and 2B illustrate parts of pixel arrays 100, 110 having an identified target pixel 32a, 32b that may undergo a corrective method in accordance with the invention. The identified target pixel 32a shown in FIG. 2A in pixel array 100 may be either a red or a blue pixel. Pixel array 110 shown in FIG. 2B has an identified pixel 32b that is a green pixel. The invention may also use one kernel applied to four color channels: red pixels, blue pixels, green pixels in a red row, and green pixels in a blue row.

In the illustrated examples, it is assumed that the pixel array 100 is associated with a Bayer pattern color filter array 82 (FIG. 1); however, the invention may also be used with other color filter patterns. The color filters 81 focus incoming light of a particular wavelength range onto the underlying pixels 80. In the Bayer pattern, as illustrated in FIG. 1, every other pixel array row consists of alternating red (R) and green (G) colored pixels, while the other rows consist of alternating green (G) and blue (B) color pixels.

According to exemplary embodiments of the invention, to denoise pixels, the present invention utilizes signal values of the nearest neighboring pixels of the identified target pixel 32a, 32b. The identified target pixel 32a, 32b is the pixel currently being processed. The neighboring pixels are collectively referred to herein as an image kernel, shown in FIGS. 2A and 2B respectively as kernels 101a, 101b outlined with a dotted line. A total of eight neighboring pixels are included in each kernel 101a, 101b. It should be noted, that the illustrated correction kernels 101a, 101b are exemplary, and that other correction kernels may be chosen for pixel arrays using color filter patterns other than the Bayer pattern. In addition, a correction kernel could encompass more or less than eight neighboring pixels, if desired.

Figure 3:
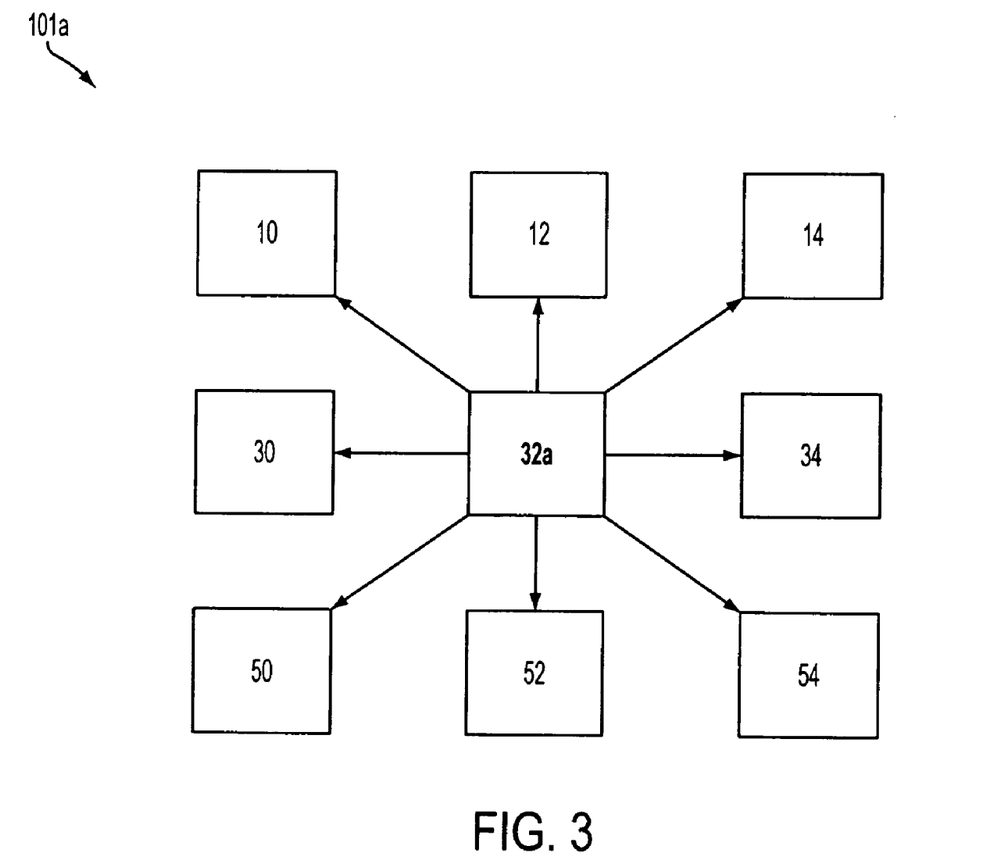
FIG. 3 depicts the correction kernel of FIG. 2A in more detail.

For kernel 101a there are eight pixels (pixels 10, 12, 14, 34, 54, 52, 50, and 30) having the same color as the identified target pixel 32a. Although it appears that correction kernel 101a contains sixteen pixels, it should be noted that half of the pixels are green pixels, whose signals would not be considered for use in the denoising of a red or blue target pixel 32a. The pixels that make up kernel 101a are shown in greater detail in FIG. 3. Kernel 101b also includes eight pixels (pixels 12, 21, 23, 30, 34, 41, 43, and 52) having the same green color as the identified pixel 32b.

Figure 4:
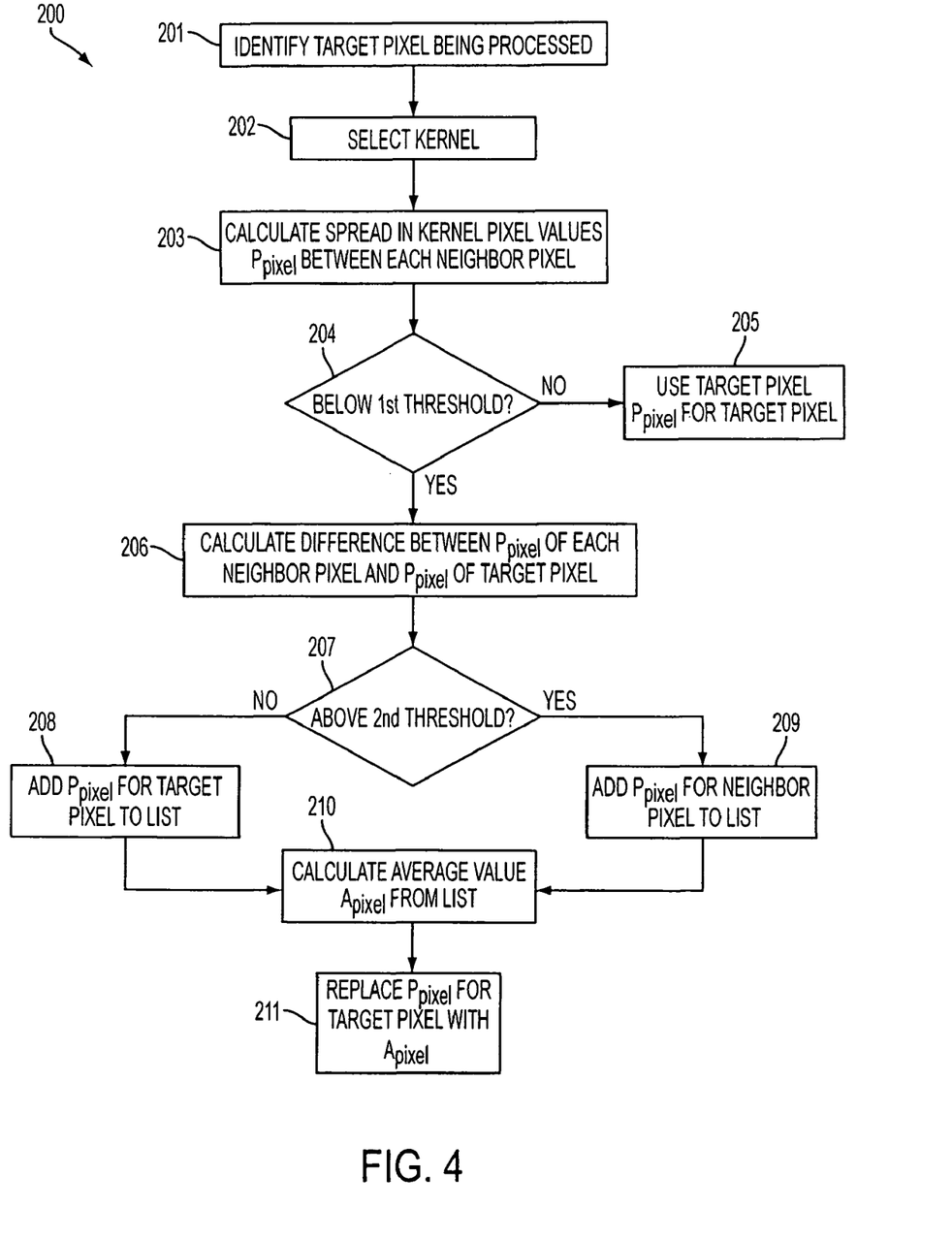
FIG. 4 shows a flowchart of a method for removing pixel noise in accordance with an exemplary method of the invention.

With reference to FIG. 4, an exemplary method 200 of the present invention is now described. The method 200 can be carried out by an image processing circuit 280 (described below with reference to FIG. 5). It should be understood that each pixel has a value that represents an amount of light received at the pixel. Although representative of a readout signal from the pixel, the value is a digitized representation of the readout analog signal. These values are represented in the following description as P(pixel) where "P" is the value and "(pixel)" is the pixel number shown in FIG. 2A or 2B. For explanation purposes only, the method 200 is described with reference to the kernel 101a and target pixel 32a as illustrated in FIG. 2A.

Initially, at step 201, the target pixel 32a being processed is identified. Next, at step 202, the kernel 101a associated with the target pixel 32a is selected/identified. After the associated kernel 101a is selected, at step 203, a spread of values P(pixel) of the neighboring pixels 10, 12, 14, 30, 34, 50, 52, 54 in kernel 101a is calculated. As used in this example, the spread is the absolute value of the difference between the maximum and minimum P(pixel) values for all the neighboring pixels 10, 12, 14, 30, 34, 50, 52, 54. In step 204, the spread is then compared with a first threshold value. For exemplary purposes only, the first threshold value could be a red threshold value if target pixel 32a is a red pixel. If the spread is greater than or equal to the first threshold value, at step 205, the value P(pixel) for the target pixel 32a is maintained and the process is complete for the target pixel 32a.

If, however, the spread is less the first threshold value, at step 206, the absolute value of the difference between the values P(pixel) for the target pixel 32a and each neighboring pixel 10, 12, 14, 30, 34, 50, 52, 54 is calculated. At step 207, for each neighboring pixel 10, 12, 14, 30, 34, 50, 52, 54, the calculated absolute value from step 206 is compared to a second threshold. If the calculated absolute value is less than or equal to the second threshold, the value P(pixel) of the target pixel 32a is added to a list of values at step 208. If, however, the calculated absolute value is greater than the second threshold, then the value P(pixel) of the respective neighboring pixel 10, 12, 14, 30, 34, 50, 52, 54 is added to the list of values at step 209. Subsequently, at step 210, the average A(pixel) of the values in the list of values is calculated. At step 211, the value P(pixel) of the target pixel 32a is replaced with the calculated average value A(pixel).

The method described herein may be carried out on each pixel signal as it is processed. As pixels values are denoised, the values of previously denoised pixels may be used to denoise other pixel values. Thereby, when the method described herein and the values of previously denoised pixels are used to denoise other pixels, the method and apparatus is implemented in a partially recursive manner (pixels are denoised using values from previously denoised pixels). However, the invention is not limited to this implementation and may be implemented in a fully recursive (pixels are denoised using values from other denoised pixels) or non-recursive manner (no pixels having been denoised are used to denoise subsequent pixels).

The method 200 described above may also be implemented and carried out, as discussed above, on target pixel 32b and associated image correction kernel 101b. For example, in step 202 kernel 101b is selected/identified. After the associated kernel 101b is selected for target pixel 32b, the spread of values of the neighboring pixels 12, 21, 23, 30, 34, 41, 43, 52 in kernel 101b located around target pixel 32b (step 203) and the value of target pixel 32b are compared to a first threshold (step 204). The remaining steps 205-211 are carried out as discussed above for the pixels corresponding to kernel 101b.

The above described embodiments may not provide sufficient denoising to remove spurious noise (i.e., noise greater than 6 standard deviations). Accordingly, the invention is better utilized when implemented after the image data has been processed by a filter which will remove spurious noise.

The invention is not limited to the above described embodiments. For example, a program embodying the method may be stored on a carrier medium which may include RAM, floppy disk, data transmission, compact disk, etc. and then be executed by an associated processor. For example, the invention may be implemented as a plug-in for existing software applications or it may used on its own. The invention is not limited to the carrier mediums specified herein and the invention may be implemented using any carrier medium as known in the art.

Figure 5:
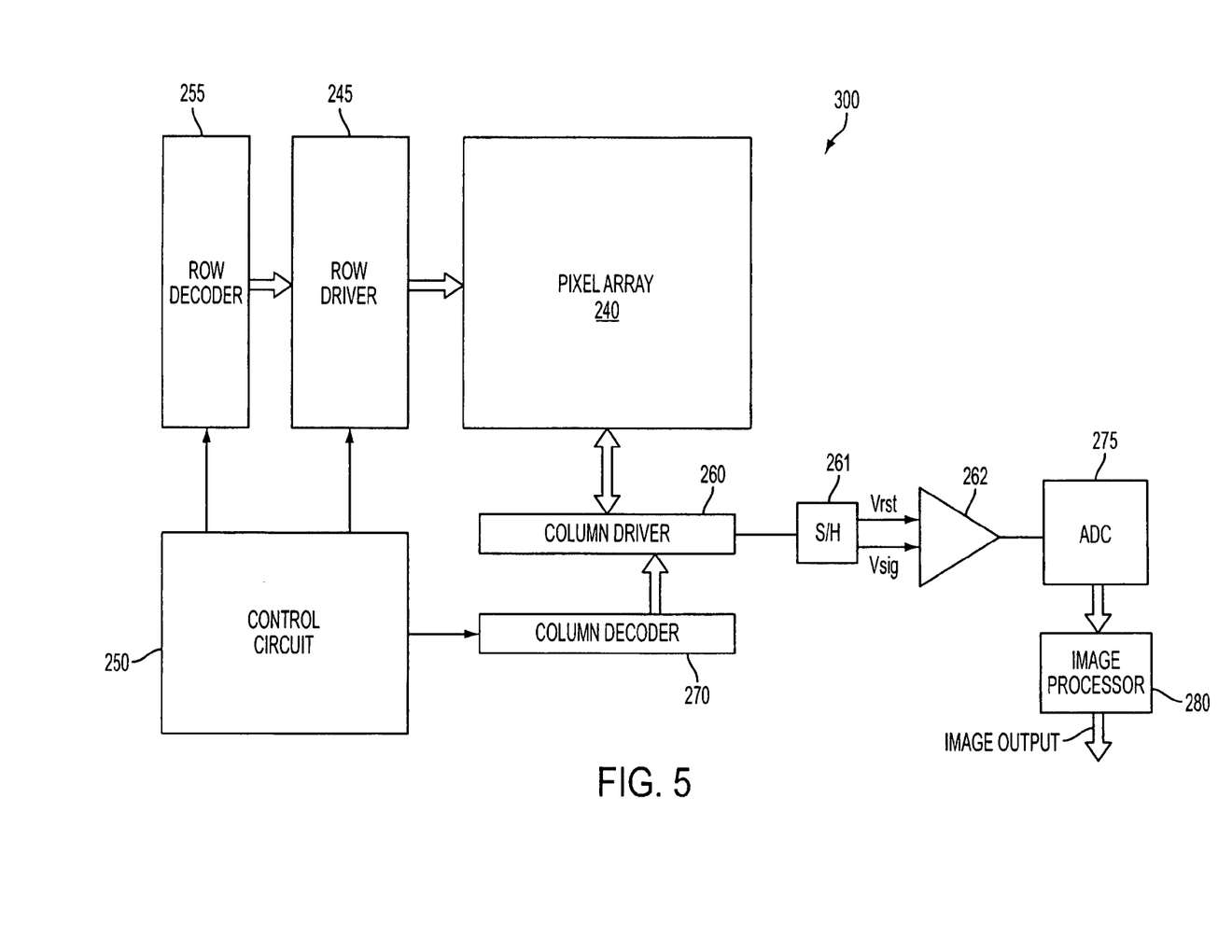
FIG. 5 shows a block diagram of an imager constructed in accordance with an exemplary embodiment of the invention.

FIG. 5 illustrates an exemplary imaging device 300 having an exemplary CMOS pixel array 240. Row lines of the array 240 are selectively activated by a row driver 245 in response to row address decoder 255. A column driver 260 and column address decoder 270 are also included in the imaging device 300. The imaging device 300 is operated by the timing and control circuit 250, which controls the address decoders 255, 270. The control circuit 250 also controls the row and column driver circuitry 245, 260.

A sample and hold circuit 261 associated with the column driver 260 reads a pixel reset signal Vrst and a pixel image signal Vsig for selected pixels of the array 240. A differential signal (Vrst-Vsig) is produced by differential amplifier 262 for each pixel and is digitized by analog-to-digital converter 275 (ADC). The analog-to-digital converter 275 supplies the digitized pixel signals to an image processor 280 which forms and may output a digital image. The image processor 280 runs a program that is capable of performing the method 200 (FIG. 4) on the digitized signals from the pixel array 240. Alternatively, processing can be done on the analog output of the pixel array by a hardwired circuit located between the amplifier 262 and ADC 275.

Figure 6:
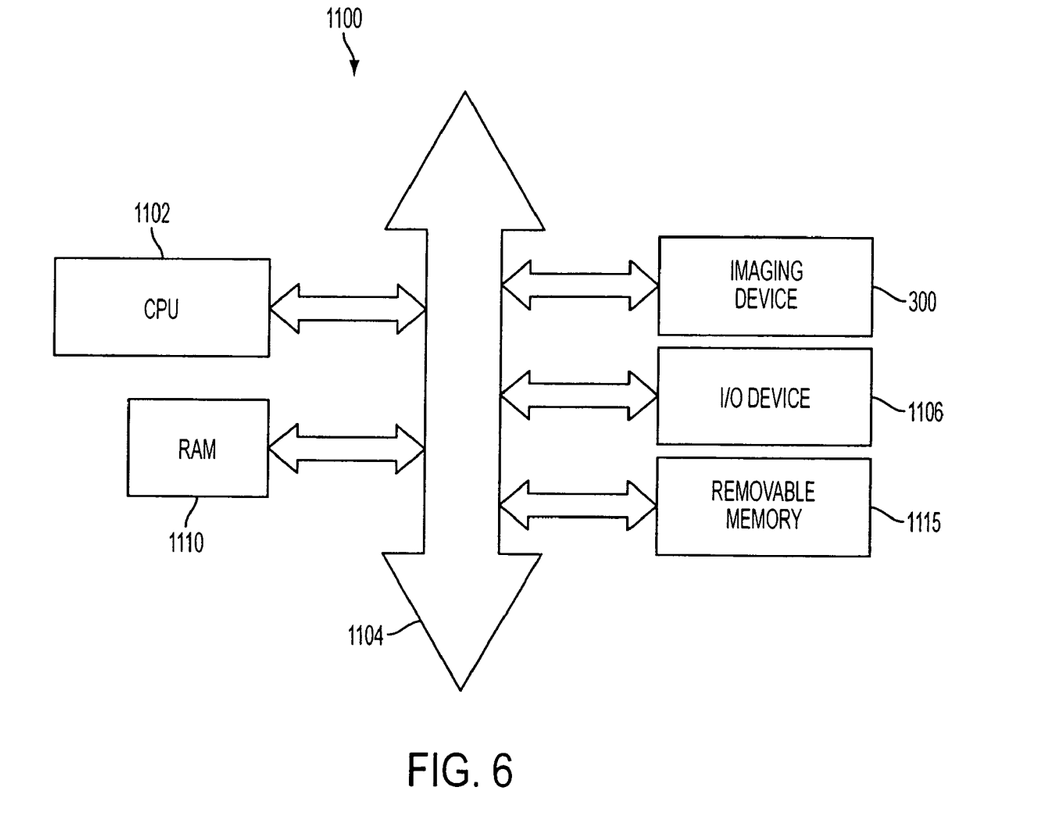
FIG. 6 shows a processor system incorporating at least one imaging device constructed in accordance with an embodiment of the invention.

FIG. 6 shows system 1100, a typical processor system modified to include the imaging device 300 (FIG. 5) of the invention. The system 1100 is exemplary of a system having digital circuits that could include image sensor devices. Without being limiting, such a system could include a computer system, still or video camera system, scanner, machine vision, video phone, and auto focus system, or other imager systems.

System 1100, for example a camera system, generally comprises a central processing unit (CPU) 1102, such as a microprocessor, that communicates with an input/output (I/O) device 1106 over a bus 1104. Imaging device 300 also communicates with the CPU 1102 over the bus 1104. The processor-based system 1100 also includes random access memory (RAM) 1110, and can include removable memory 1115, such as flash memory, which also communicate with the CPU 1102 over the bus 1104. The imaging device 300 may be combined with a processor, such as a CPU, digital signal processor, or microprocessor, with or without memory storage on a single integrated circuit or on a different chip than the processor.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, the methods can be used with pixels in other patterns than the described Bayer pattern, and the correction kernels would be adjusted accordingly. The exemplary noise filter could be applied, for example, either to each color separately in Bayer, Red/Green/Blue (RGB), Cyan/Magenta/Yellow/Key (CMYK), luminance/chrominance (YUV), or other color space. In addition, the invention is not limited to the type of imager device in which it is used. Thus, the invention is not to be seen as limited by the foregoing description, but is only limited by the scope of the appended claims.

What is claimed as new and desired to be protected by Letters Patent of the United States is:

1. A method of reducing noise in an image comprising using a processor to perform the steps of:
   obtaining a first value for a target pixel;
   obtaining a respective second value for each neighboring pixel surrounding said target pixel;
   identifying a spread for the second values;
   comparing said spread to a first threshold value; and
   if said spread is less than said first threshold value, for each neighbor pixel:
   calculating an absolute value of a difference between said target pixel and said neighbor pixel,
   comparing said absolute value to a second threshold value,
   if said absolute value is greater than said second threshold value, adding the second value of the neighbor pixel to a list of values, otherwise, adding said first value to said list of values,
   calculating an average value from said list of values, and
   replacing said first value with said average value.

2. The method of claim 1, further comprising: if said spread is greater than or equal to said first threshold value, preserving said first value for said target pixel.

3. The method of claim 1, wherein each of said neighbor pixels has a same color as said target pixel.

4. The method of claim 1, wherein said first value is one of a red, green, and blue image signal value.

5. The method of claim 4, wherein said second values are the same type of red, green, and blue signal value as said first value.

6. The method of claim 1, wherein said first value is one of a luminance or chrominance image signal value.

7. The method of claim 6, wherein said second values are the same type of luminance or chrominance value as said first value.

8. The method of claim 1, wherein said first and second threshold values are based on at least one of an analog and digital gain.

9. The method of claim 1, wherein the method is implemented as a recursive method.

10. The method of claim 1, wherein the method is implemented as a non-recursive method.

11. The method of claim 1, wherein the method is implemented as a partially recursive method.

12. An imaging device comprising:
   a pixel array comprising a plurality of pixels, each pixel outputting a signal representing an amount of light received; and
   a pixel denoising circuit for denoising at least one identified pixel value,
   wherein said pixel denoising circuit is configured to perform steps of:
   obtaining a first value for a target pixel;
   obtaining a respective second value for each neighboring pixel surrounding said target pixel;
   identifying a spread for the second values;
   comparing said spread to a first threshold value; and
   if said spread is less than said first threshold value, for each neighbor pixel:

calculating an absolute value of a difference between said target pixel and said neighbor pixel, comparing said absolute value to a second threshold value, if said absolute value is greater than said second threshold value, adding the second value of the neighbor pixel to a list of values, otherwise, adding said first value to said list of values, calculating an average value from said list of values, and replacing said first value with said average value.

13. The imaging device of claim 12, further comprising: if said spread is greater than or equal to said first threshold value, preserving said first value for said target pixel.

14. The imaging device of claim 12, wherein each of said neighbor pixels has a same color as said target pixel.

15. The imaging device of claim 12, wherein said first value is one of a red, green, and blue image signal value.

16. The imaging device of claim 15, wherein said second values are the same type of red, green, and blue signal value as said first value.

17. The imaging device of claim 12, wherein said first value is one of a luminance or chrominance image signal value.

18. The imaging device of claim 17, wherein said second values are the same type of luminance or chrominance value as said first value.

19. The imaging device of claim 12, wherein said first and second threshold values are based on at least one of an analog and digital gain.

20. The imaging device of claim 12, wherein the steps are implemented recursively.

21. The imaging device of claim 12, wherein the steps are implemented non-recursively.

22. The imaging device of claim 12, wherein the steps are implemented partially recursively.

23. A processor configured to execute a stored program for denoising an image, said program enabling said processor to carry out the acts of:

obtaining a first value for a target pixel;

obtaining a respective second value for each neighboring pixel surrounding said target pixel;

identifying a spread for the second values;

comparing said spread to a first threshold value; and if said spread is less than said first threshold value, for each neighbor pixel:

calculating an absolute value of a difference between said target pixel and said neighbor pixel, comparing said absolute value to a second threshold value, if said absolute value is greater than said second threshold value, adding the second value of the neighbor pixel to a list of values, otherwise, adding said first value to said list of values, calculating an average value from said list of values, and replacing said first value with said average value.

24. The processor of claim 23, said program further enabling said processor to denoise an image by carrying out the act of: if said spread is greater than or equal to said first threshold value, preserving said first value for said target pixel.

25. The processor of claim 23, wherein each of said neighbor pixels has a same color as said target pixel.

26. The processor of claim 23, wherein said first value is one of a red, green, and blue image signal value.

27. The processor of claim 26, wherein said second values are the same type of red, green, and blue signal value as said first value.

28. The processor of claim 23, wherein said first value is one of a luminance or chrominance image signal value.

29. The processor of claim 28, wherein said second values are the same type of luminance or chrominance value as said first value.

30. The processor of claim 23, wherein said first and second threshold values are based on at least one of an analog and digital gain.

31. The processor of claim 23, wherein the program is implemented recursively.

32. The processor of claim 23, wherein the program is implemented non-recursively.

33. The processor of claim 23, wherein the program is implemented partially recursively.

34. A computer-readable medium encoded with a computer program for enabling a processor to denoise an image comprising the steps of:

obtaining a first value for a target pixel;

obtaining a respective second value for each neighboring pixel surrounding said target pixel;

identifying a spread for the second values;

comparing said spread to a first threshold value; and if said spread is less than said first threshold value, for each neighbor pixel:

calculating an absolute value of a difference between said target pixel and said neighbor pixel, comparing said absolute value to a second threshold value, if said absolute value is greater than said second threshold value, adding the second value of the neighbor pixel to a list of values, otherwise, adding said first value to said list of values, calculating an average value from said list of values, and replacing said first value with said average value.

35. The computer readable medium of claim 34, said computer program further comprising the act of: if said spread is greater than or equal to said first threshold value, preserving said first value for said target pixel.

36. The computer readable medium of claim 34, wherein each of said neighbor pixels has a same color as said target pixel.

37. The computer readable medium of claim 34, wherein said first value is one of a red, green, and blue image signal value.

38. The computer readable medium of claim 37, wherein said second values are the same type of red, green, and blue signal value as said first value.

39. The computer readable medium of claim 34, wherein said first value is one of a luminance or chrominance image signal value.

40. The computer readable medium of claim 39, wherein said second values are the same type of luminance or chrominance value as said first value.

41. The computer readable medium of claim 34, wherein said first and second threshold values are based on at least one of an analog and digital gain.

42. The computer readable medium of claim 34, wherein the program is implemented recursively.

43. The computer readable medium of claim 34, wherein the program is implemented non-recursively.

44. The computer readable medium of claim 34, wherein the program is implemented partially recursively.

* * * * *